US012598324B2

(12) United States Patent
Ninan

(10) Patent No.: US 12,598,324 B2
(45) Date of Patent: Apr. 7, 2026

(54) DEPTH DIFFERENCES IN PLACE OF MOTION VECTORS

(71) Applicant: Dolby Laboratories Licensing Corporation, San Francisco, CA (US)

(72) Inventor: Ajit Ninan, San Jose, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 62 days.

(21) Appl. No.: 18/833,097

(22) PCT Filed: Jan. 30, 2023

(86) PCT No.: PCT/US2023/061570
§ 371 (c)(1),
(2) Date: Jul. 25, 2024

(87) PCT Pub. No.: WO2023/150488
PCT Pub. Date: Aug. 10, 2023

(65) Prior Publication Data
US 2025/0113057 A1     Apr. 3, 2025

Related U.S. Application Data

(60) Provisional application No. 63/305,651, filed on Feb. 1, 2022.

(30) Foreign Application Priority Data

Feb. 9, 2022     (EP) ..................................... 22155825

(51) Int. Cl.
*H04N 19/597*     (2014.01)
*H04N 19/119*     (2014.01)
(Continued)

(52) U.S. Cl.
CPC ......... *H04N 19/597* (2014.11); *H04N 19/119* (2014.11); *H04N 19/139* (2014.11); (Continued)

(58) Field of Classification Search
CPC .. H04N 19/597; H04N 19/119; H04N 19/139; H04N 19/176; H04N 19/177; H04N 19/52; H04N 19/593
See application file for complete search history.

(56) References Cited

U.S. PATENT DOCUMENTS 9,094,667 B1 *     7/2015     Hejl ..................... H04N 19/105
2013/0022111 A1     1/2013     Chen
(Continued)

OTHER PUBLICATIONS

Bing-Bing (Depth map compression for real-time view-based rendering—Pattern Recognition Letters 25 (2004) 755-766; doi: 10.1016/ j.patrec.2004.01.002) (Year: 2004).*
(Continued)

*Primary Examiner* — Nasim N Nirjhar

(57) ABSTRACT

Input texture images are received. Depth maps are determined for the input texture images. Each depth map in the depth maps includes depth values of pixels represented in a corresponding input texture image in the input texture images. Depth difference maps are generated from the depth maps. The depth difference maps include at least one depth difference map that is generated from two successive depth maps in the depth maps. A video signal encoded with a compressed version of the input texture images and the depth difference maps is outputted. The video signal causes a recipient device of the video signal to generate display images from the compressed version of the input texture images and the depth difference maps for rendering on an image display.

12 Claims, 10 Drawing Sheets

(51) Int. Cl.
    *H04N 19/139*     (2014.01)
    *H04N 19/176*     (2014.01)
    *H04N 19/177*     (2014.01)
    *H04N 19/52*     (2014.01)

(52) U.S. Cl.
    CPC ......... *H04N 19/176* (2014.11); *H04N 19/177*
    (2014.11); *H04N 19/52* (2014.11)

(56) References Cited

U.S. PATENT DOCUMENTS

| | | | | |
|---|---|---|---|---|
| 2013/0188013 | A1* | 7/2013 | Chen | H04N 19/70 |
| | | | | 348/43 |
| 2013/0202194 | A1 | 8/2013 | Graziosi | |
| 2014/0253682 | A1* | 9/2014 | Zhang | H04N 19/463 |
| | | | | 348/43 |
| 2014/0341289 | A1 | 11/2014 | Schwarz | |
| 2017/0006296 | A1* | 1/2017 | Park | H04N 19/176 |
| 2017/0302961 | A1* | 10/2017 | Ikai | H04N 19/597 |

OTHER PUBLICATIONS

ITU-T H.264, "Advanced video coding for generic audiovisual services," Aug. 2021, pp. 1-844.
ITU-T H.265, "High efficiency video coding," Sep. 2023, pp. 1-718.
ITU-T H.266, "Versatile Video Coding," Sep. 2023, pp. 1-538.
Liu Zhanqi et al: "Motion and Depth Assisted Workload Prediction for Parallel View Synthesis", Dec. 15, 2015 (Dec. 15, 2015), SAT 2015 18th International Conference, Austin, TX, USA, Sep. 24-27, 2015, pp. 3-13.
Shahriyar Shampa et al: "Efficient Coding of Depth Map by Exploiting Temporal Correlation", 2014 International Conference on Digital Image Computing: Techniques and Applications (DICTA), IEEE, Nov. 25, 2014 (Nov. 25, 2014), pp. 1-8.

* cited by examiner receive input texture images 402 determine depth maps 404 generate depth difference maps 406 output a video signal encoded with compressed texture images and the depth difference maps 408

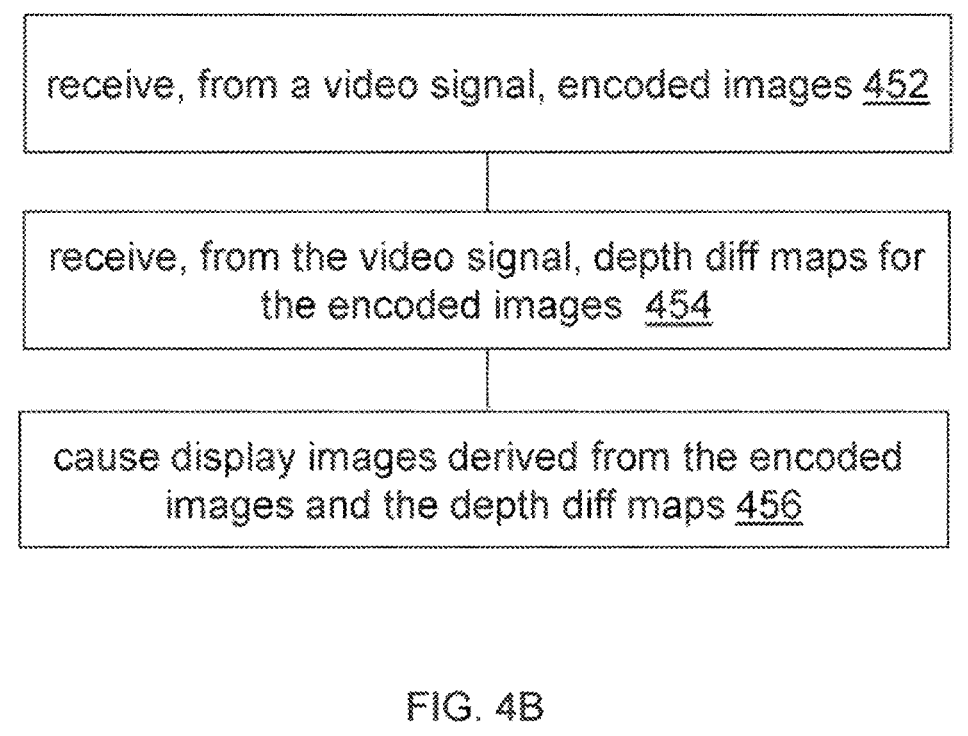

```
┌─────────────────────────────────────────────────┐
│  receive, from a video signal, encoded images 452 │
└─────────────────────────────────────────────────┘
                          │
┌─────────────────────────────────────────────────┐
│  receive, from the video signal, depth diff maps for │
│           the encoded images  454                  │
└─────────────────────────────────────────────────┘
                          │
┌─────────────────────────────────────────────────┐
│  cause display images derived from the encoded     │
│      images and the depth diff maps 456            │
└─────────────────────────────────────────────────┘
```

FIG. 4B

DEPTH DIFFERENCES IN PLACE OF MOTION VECTORS

CROSS-REFERENCE TO RELATED APPLICATIONS

This application is a U.S. National Stage application under U.S.C. 371 of International Application No. PCT/US2023/061570, filed on Jan. 30, 2023, which claims priority of the following priority applications: U.S. provisional application 63/305,651, filed 1 Feb. 2022, and European Patent Application No. 22155825.7, filed 9 Feb. 2022, each of which is hereby incorporated by reference in its entirety.

TECHNOLOGY

The present invention relates generally to image processing operations. More particularly, an embodiment of the present disclosure relates to video codecs.

BACKGROUND

Texture images and depth images can be coded in a video signal to support 3D or multiview video streaming and rendering of recipient device(s) of the video signal. The texture images can be compressed to remove inter- and intra-frame data redundancy—for example using inter- and intra-prediction—from encoded texture video data in the video signal and hence reduce the total amount of texture image data. Likewise, depth data can be compressed to remove data redundancy from encoded depth data in the video signal and hence reduce the total amount of depth image data.

Needless to say, the resultant total amount of the encoded video and depth data to support a seamless high quality experience in 3D or multiview video streaming and rendering could still be enormous in many operational scenarios.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF DRAWINGS

The present invention is illustrated by way of example, and not by way of limitation, in the figures of the accompanying drawings and in which like reference numerals refer to similar elements and in which:

FIG. 4A and FIG. 4B illustrate example process flows; and

DESCRIPTION OF EXAMPLE EMBODIMENTS

Figure 1A:
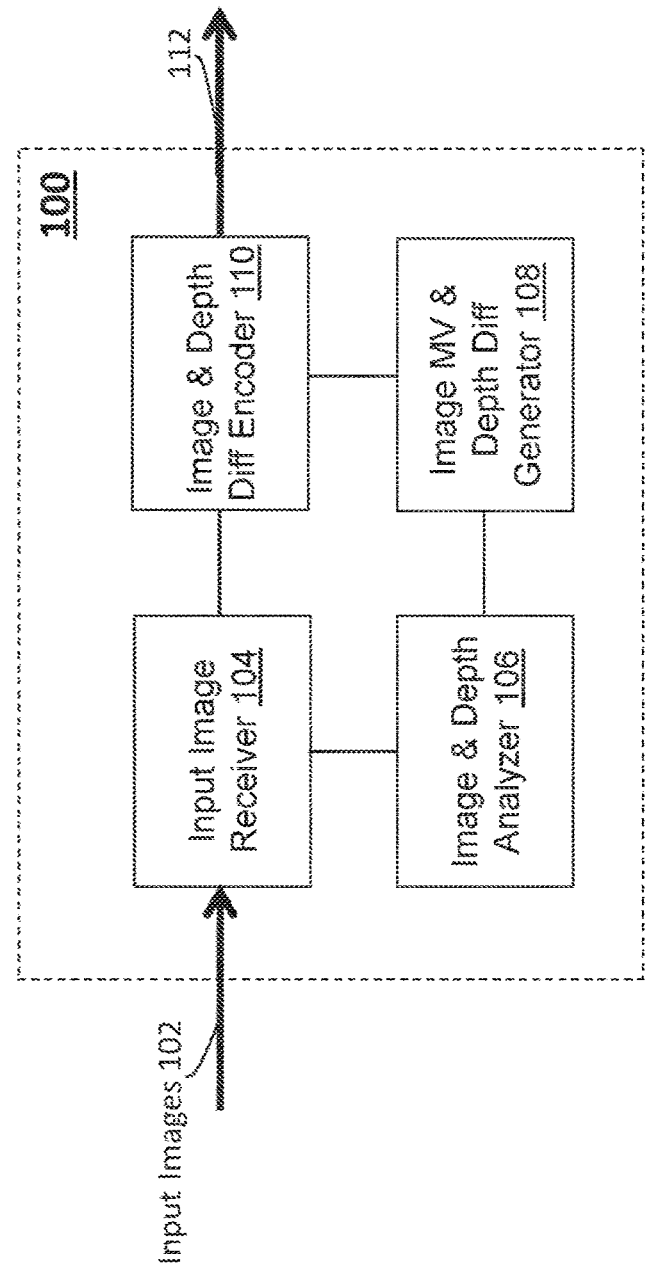
FIG. 1A and FIG. 1C illustrate an example image and depth diff data server in different configurations.

Example embodiments, which relate to supporting 2D, 3D or multiview video coding and rendering with depth differences in place of motion vectors, are described herein. In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily occluding, obscuring, or obfuscating the present invention.

Example embodiments are described herein according to the following outline:

1. GENERAL OVERVIEW
2. IMAGE AND DEPTH DIFF DATA SERVER
3. DEPTH MAPS AND DEPTH DIFF MAPS
4. DERIVATION OF MOTION PARAMETERS
5. EXAMPLE PROCESS FLOWS
6. IMPLEMENTATION MECHANISMS-HARDWARE OVERVIEW
7. EQUIVALENTS, EXTENSIONS, ALTERNATIVES AND MISCELLANEOUS

1. General Overview

This overview presents a basic description of some aspects of an example embodiment of the present invention. It should be noted that this overview is not an extensive or exhaustive summary of aspects of the example embodiment. Moreover, it should be noted that this overview is not intended to be understood as identifying any particularly significant aspects or elements of the example embodiment, nor as delineating any scope of the example embodiment in particular, nor the invention in general. This overview merely presents some concepts that relate to the example embodiment in a condensed and simplified format, and should be understood as merely a conceptual prelude to a more detailed description of example embodiments that follows below. Note that, although separate embodiments are discussed herein, any combination of embodiments and/or partial embodiments discussed herein may be combined to form further embodiments.

To support two-dimensional (2D), three-dimensional (3D) or multiview video streaming and rendering, a video signal may include a compressed version of texture images and a compressed version of depth images corresponding to the texture images. A texture image may be represented in a color space of multiple color channels such as an RGB color space, a YCbCr color space, and so forth. The texture image may comprise an array (e.g., a two-dimensional array of image frame, etc.) of texture pixel values each of which may include multiple component codeword values respectively in the color channels of the color space in which the texture image is represented.

Each of the depth images encoded in the video signal may comprise a plurality of depth values for some or all pixels in an array of pixels represented in a respective texture image in the texture images.

The texture images may be partitioned into scenes or groups of pictures. Texture information within a scene or group of pictures may be temporally relatively stable as compared with texture information across different scenes or different groups of pictures.

To generate the compressed version of the texture images in the video signal, predictive coding including but not limited to inter-prediction coding may be used to remove data redundancy between time adjacent texture images in a scene or group of pictures.

Under some approaches that do not implement techniques as described herein, motion vectors may be generated or estimated from texture image content as indicated by texture pixel values in texture image coding operations. For example, intensity, luma, chroma or color values of texture pixel values of pixels in two time adjacent texture images, which may be referred to as a first texture image and a second texture image, can be analyzed by texture encoding operations in a video encoder to determine whether a first image/video block in the first texture image corresponds to a second image/video block in the second texture image.

If texture pixel values of pixels in the first and second image/video blocks from the first and two images share sufficient similarities in visual characteristics as indicated by the intensity, luma, chroma or color values of the texture pixel values, a motion vector may be determined using positions (e.g., row-and-column combinations, etc.) of the pixels in the image/video blocks of the texture images and frame indexes (each of which logically represent a time point) of the texture images.

For instance, given texture pixel values of pixels in the first image/video block in the first texture images, texture pixel values of pixels of the second image/video block in the second texture image can be inferred, predicted or estimated based at least in part on the motion vector. Texture pixel value prediction errors or texture residual values such as motion-compensated difference information can be computed in the video encoding operations performed by the video encoder as differences between the predicted texture pixel values of pixels of the second image/video block in the second texture image and (actual, non-predicted) texture pixel values of pixels of the second image/video block in the second texture image.

As a result, the (actual, non-predicted) texture pixel values of pixels of the second image/video block in the second texture image are not directly encoded by the video encoder in the compressed version of the texture images. Rather, some or all of the residual textural values, the motion vector and reference information for the second image/video block in the second texture image to refer to the first image/video block in the first texture image are encoded in the compressed version of the texture images.

Hence, under these approaches that do not implement techniques as described herein, motion vectors, as generated or estimated from texture pixel values of texture images are encoded in the compressed version of the texture images in the video signal. Similar or different compression methods can be implemented to compress the depth images into the compressed version of the depth images encoded in the video signal, along with the compressed version of the texture images that contain the motion vectors.

In contrast, under techniques as described herein, motion parameters used to generate encoded texture images do not need to be transmitted with the encoded texture images in a video signal. Rather, the motion parameters used to generate encoded texture images can be generated or regenerated from depth diff maps generated by the techniques as described herein by an upstream device such as a video encoder that encodes the encoded image into the video signal as well as regenerated by a recipient downstream device of the video signal.

In addition, depth information for pixels represented in the encoded texture images in the video signal can be generated or regenerated from the same depth diff maps by the upstream device as well as by the recipient downstream device. As a result, a relatively large saving of bitrate can be obtained or achieved under techniques as described herein to carry the encoded texture images with the depth diff maps in the video signal freed from carrying the motion parameters. Additionally, optionally or alternatively, further compression efficiency may be obtained or achieved by encoding the depth diff maps having relatively small numeric values—which may be comparable to data sizes of residuals in the encoded texture images—instead of directly encoding depth maps having relatively large numeric values into the video signal. Additionally, optionally or alternatively, processing accuracy and efficiency may be obtained, achieved or compensated under techniques as described herein by freeing upstream and downstream devices from performing some or all of image processing operations relating to optimizing motion parameters or prediction related operational parameters. In the meantime, these techniques also enable a wide range of available video codecs to continue to operate and perform MCP or motion vector prediction with motion parameters that can be derived indirectly from depth diff maps, rather than directly from coded motion parameters in the video signal.

Example embodiments described herein relate to encoding image content. A sequence of input texture images is received. A sequence of depth maps is determined for the sequence of input texture images. Each depth map in the sequence of depth maps includes depth values of a plurality of pixels represented in a corresponding input texture image in the sequence of input texture images. A sequence of depth difference maps is generated from the sequence of depth maps. The sequence of depth difference maps includes at least one depth difference map that is generated from two successive depth maps in the sequence of depth maps. A video signal encoded with a compressed version of the sequence of input texture images and the sequence of depth difference maps is outputted. The video signal causes a recipient device of the video signal to generate a sequence of display images from the compressed version of the sequence of input texture images and the sequence of depth difference maps for rendering on an image display.

Example embodiments described herein relate to decoding image content. A sequence of encoded image is retrieved from a video signal. The sequence of encoded image represents a compressed version of a sequence of input texture images. The sequence of input texture images has been used by an upstream device to generate the sequence of encoded images encoded in the video signal. A sequence of depth difference maps is retrieved from the video signal. The sequence of depth difference maps has been generated by the upstream device from a sequence of depth maps determined for the sequence of input texture images. A sequence of display images derived from the sequence of encoded images and the sequence of depth difference maps is caused to be rendered on an image display.

In some example embodiments, mechanisms as described herein form a part of a media processing system, including but not limited to any of: cloud-based server, mobile device, virtual reality system, augmented reality system, head up display device, helmet mounted display device, CAVE-type system, wall-sized display, video game device, display device, media player, media server, media production system, camera systems, home-based systems, communication devices, video processing system, video codec system, studio system, streaming server, cloud-based content service system, a handheld device, game machine, television, cinema display, laptop computer, netbook computer, tablet computer, cellular radiotelephone, electronic book reader, point of sale terminal, desktop computer, computer work-station, computer server, computer kiosk, or various other kinds of terminals and media processing units.

Various modifications to the preferred embodiments and the generic principles and features described herein will be readily apparent to those skilled in the art. Thus, the disclo-sure is not intended to be limited to the embodiments shown, but is to be accorded the widest scope consistent with the principles and features described herein.

2. Image and Depth Diff Data Server

FIG. 1A illustrates an example image and depth diff data server 100—such as a video encoder device, a video stream-ing server, or an upstream device—that comprises an input image receiver 104, an image and depth analyzer 106, an image MV and depth diff generator 108, an image and depth diff data encoder 110, etc. Some or all of the components of the image and depth diff data server (100) may be imple-mented by one or more devices, modules, units, etc., in software, hardware, a combination of software and hard-ware, etc.

The input image receiver (104) comprises software, hard-ware, a combination of software and hardware, etc., config-ured to receive or access a sequences of input (e.g., 2D, single-view, stereoscopic, multiview, etc.) texture images 102 originated from an internal or external texture image source. The sequence of input texture images (102) depicts visual scenes for a sequence of time points covering a time duration (e.g., of a media program, etc.). Each input texture image in the sequence of input texture images (102)—which may be indexed by respective unique frame indexes or index values representing respective logical time instances/points—corresponds to a respective time point in the sequence of time points and comprises an individual pixel value for each pixel in an array of pixels in an image frame. The individual pixel value may include multiple component codewords for multiple color channels of a color space in which each input texture image in the sequence of input texture images (102) is represented.

For the purpose of implementing predictive coding to reduce data redundancy in a video signal 112, the image and depth diff data server (100) can partition the sequence of (e.g., consecutive, sequential, mutually exclusive, etc.) input texture images (102) into a sequence of (e.g., consecutive, sequential, mutually exclusive, etc.) GOPs. Each GOP in the sequence of GOPs represents a group or collection of successive texture images encoded in the video signal (112) outputted by the image and depth diff data server (100).

Each GOP as described herein comprises or begins with an I-frame or image (e.g., intra coded picture, keyframe or i-frame, etc.) coded independently of all other texture images represented in the GOP or the video signal (112). The GOP further comprises one or more of: texture image(s) represented by P-frame(s), texture image(s) represented by B-frame(s), other non-I-frames, etc. A P-frame (or predictive coded picture) as described herein comprises residuals or motion-compensated difference information, for example referring to at least one previously decoded (reference) texture image. A B-frame (or bi-predictive coded picture) as described herein comprises residuals or motion-compen-sated difference information referring to multiple (e.g., two, etc.) previously decoded (reference) texture images.

The image and depth analyzer (106) comprises software, hardware, a combination of software and hardware, etc., configured to perform texture image analysis on the sequences of input texture images (102), determine or esti-mate depths of pixels represented in the input texture images, etc. For example, input texture images in a GOP and/or its adjacent GOP(s) in the sequence of GOPs may be analyzed to determine or estimate depths of pixels repre-sented in the input texture images or in selective few (e.g., every few frames, every I-frame, etc.) of the input texture images in the GOP and/or its adjacent GOP(s).

In some operational scenarios, depths of pixels of an input texture image may be determined or estimated based at least in part on extracted information relating to blurring (e.g., "circle of confusion" or COC, etc.) or deblurring, focus or defocus, stereo vision and/or motion. The information used to determine or estimate the depths may be extracted from some or all of the texture pixel values of the input texture image and/or texture pixel values of time-adjacent or spatial-adjacent images represented in the sequence of input texture images (102).

A sequence of depth maps can be generated by the image and depth analyzer (106) for the sequence of input texture images (102) or the sequence of GOPs. In an example, the sequence of depth maps has a one-to-one-correspondence with the sequence of input texture images (102). Each depth map in the sequence of depth maps corresponds to, or specify individual depths of some or all pixels in, a respec-tive input texture image in the sequence of input texture images (102).

In another example, the sequence of depth maps does not have a one-to-one-correspondence with the sequence of input texture images (102). Each depth map in the sequence of depth maps corresponds to, or specify individual depths of some or all pixels in, a respective input texture image in a sequence of selective input texture images in the sequence of input texture images (102). The sequence of selective input texture images may be made up of input texture images that are specifically selected from the sequence of input texture images (102), for example to be represented as a sequence of (e.g., consecutive, sequential, etc.) I-frames in the sequence of GOPs encoded in the video signal (112). Hence, in this example, each I-frame in the sequence of I-frames represents a respective input texture image in the sequence of selective input texture images and corresponds to (e.g., a beginning picture/image in, etc.) a respective GOP in the sequence of GOPs. And each depth map in the sequence of depth maps corresponds to, or includes indi-vidual depths of some or all pixels of, a respective I-frame in the sequence of I-frames.

The image MV and depth diff generator (108) comprises software, hardware, a combination of software and hard-ware, etc., configured to use the sequence of depth maps and/or the sequence of input texture images (102) to deter-mine or identify one or more pixel sets of contiguous and co-moving pixels in each depth map in the sequence of depth maps.

Since the depth map specifies depths of pixels at the same pixel locations in an input texture image to which the depth map correspond, the pixel sets of contiguous and co-moving pixels as determined or identified in the depth map has a one-to-one correspondence relationship with one or more pixel sets of contiguous and co-moving pixels at the same pixel locations in the corresponding input texture image. The one or more pixel sets—the pixels in which have the depths specified in the depth map and have texture pixel values specified in the input texture image to which the depth map corresponds—may respectively represent one or more image features depicted in the input texture image and the depth map. Each pixel set in the one or more pixel sets may visually represent a respective image feature in the one or more image features, for example when the input texture image and the depth map are used to generate a display image rendered on an image display.

A visual scene depicted in one or more (e.g., consecutive, sequential, etc.) GOPs in the sequence of GOPs as described herein may include some or all of: foreground image features visually representing foreground visual objects, background image feature(s) representing background visual objects, etc. As used herein, a visual object or an image feature as described herein may refer to a visually perceivable form (1) whose spatial contour or boundary may be of a visually perceivable irregular shape visually defined, outlined or delineated by soft or hard edges (outermost border pixels) of the visual object or image feature, (2) whose texture may be defined or represented by texture pixel values of pixels covered by the visual object or image feature, and (3) whose depth(s) may be defined or represented by depth values of the pixels measured along a depth axis. The depth axis may be a z axis of a three-dimensional Cartesian coordinate system with a reference point or origin coinciding with the virtual or real camera capturing or generating the texture image that includes the visual object or image feature. Example visual objects or image features depicting at least parts thereof may include, but are not necessarily limited to only, some or all of: human characters, animated characters or objects, vehicles, roads, trees, building, architectures, art objects, cars, airplanes, trains, and so forth.

A visual object—or each of one or more image features depicting the visual object in an input texture image and/or a depth map corresponding to the input texture image—is not a logically defined image/video block (e.g., a slice, a video coding unit such as a quadtree node, a coding tree unit or CTU, etc.) of regular shape such as a rectangle or square of pixels used in (e.g., quadtree based, etc.) video coding or collection of image/video blocks (or slices, video coding units, quadtree nodes, CTUs, etc.) of regular shapes used in the video coding. The visual object and its edges and textures of the visual object can be visually perceived, delineated and distinguished from other image features depicted in the texture images by a viewer to whom the input texture image and/or the depth map are rendered. In contrast, a logical data unit such as a logically defined image/video block, slice, coding unit, quadtree node, CTU and so on cannot be visually perceived, delineated or distinguished by the viewer.

A visual object as described herein may be visually represented or depicted, in a texture image belong to the GOP, by a single image feature or by multiple image features. Each image feature of the image feature(s) representing the visual object may be visually depicted or represented by texture pixel values of pixels in a corresponding pixel set of contiguous (or spatially adjacent) co-moving pixels in an input texture image and/or by depths of the same pixels in the same pixel set in a depth map corresponding to the input texture image.

For example, a visual object may visually represent a human character, whereas one or more image features such as a first image feature, a second image feature, a third image feature, etc., may respectively visually represent parts of the visual object such as the head, right hand, left hand, etc., of the human character. The first image feature visually representing the head of the human character in the texture image and/or corresponding depth map may include a first pixel set of contiguous (or spatially adjacent) co-moving pixels whose pixel values in the texture image provides texture information of the head of the human character. However, if the pixels used to visually depict or represent the head are no longer co-moving (e.g., the human character is making a visual expression with the face, etc.), these pixels depicting the head of the human character may be determined or identified as in different pixel sets each of which comprises contiguous (or spatially adjacent) co-moving pixels.

In some operational scenarios, similarity or dissimilarity in texture pixel values of pixels—for example, similar color values/pattern in spatially adjacent pixels—in or between two or more successive input texture images in a GOP and/or preceding/succeeding GOP(s) may be used to determine or identify pixels sets each of which includes pixels of co-moving or non-co-moving pixels in the successive texture images. Additionally, optionally or alternatively, in some operational scenarios, mutually adjacent depth values in depth values of pixels—for example, similar depth values or relatively smoothly transitioning depth values in spatially adjacent pixels—in or between two or more successive depth maps in the GOP and/or preceding/succeeding GOP(s) may be used to determine or identify the pixel sets.

Once pixel sets of contiguous (or spatially adjacent) co-moving pixels are identified in a depth map corresponding to an input texture image, pixel sets of contiguous (or spatially adjacent) co-moving pixels are also identified in the input texture image in the GOP, as depth pixels represented in the depth map have one-to-one correspondence relationships with corresponding texture pixels represented in the input texture image. For example, the depth pixels in an array of pixels in the depth map have the same row/column indexes or array locations as the texture pixels in a corresponding array of pixels in the texture image. Conversely, once pixel sets of contiguous (or spatially adjacent) co-moving pixels are identified in an input texture map, pixel sets of contiguous (or spatially adjacent) co-moving pixels are also identified in a depth map corresponding to the input texture image.

In some operational scenarios, pixel sets are (e.g., explicitly, etc.) determined or identified in an I-frame starting a GOP or in a depth map corresponding to the I-frame. While pixel sets in other types of frames in the GOP may not be determined or identified explicitly, they may be inferred from spatial or planar movements or displacements of the pixel sets determined or identified explicitly in the I-frame. For example, a first depth map for a first I-frame starting a first GOP and a second depth map for a second I-frame starting a second GOP (e.g., immediately, etc.) following the first GOP may be used to determine spatial or planar movements or displacements between corresponding pixel sets shared in the first and second GOP. These movements or displacements can be used to compute or infer (e.g., via interpolation or extrapolation, etc.) locations of the corresponding pixel sets for other types of frames in the first or second GOP.

By way of illustration but not limitation, the image MV and depth diff generator (108) may determine, for each pixel set in one or more pixel sets determined or identified in or between two time adjacent input texture images or two corresponding time adjacent depth maps, a planar displacement of pixels in the pixel set between the two time adjacent texture images (or the two time adjacent depth maps). In an example, the two time adjacent texture images (or the two time adjacent depth maps) may be entirely within a single GOP. In another example, one of the two time adjacent texture images (or one of the two time adjacent depth maps) may be a first I-frame starting a first GOP, whereas the other of the two time adjacent texture images (or the other of the two time adjacent depth maps) may be a second I-frame starting a second GOP (e.g., immediately, etc.) following the first GOP.

The planar displacement of the pixel set may refer to a (two-dimensional) positional change of the pixel set within an image plane perpendicular to the depth axis or z-axis in or between the two time adjacent texture images (or the two time adjacent depth maps). Here, the image plane may represent a screen or canvas of an image display with which the texture images/depth maps are to be rendered. The image plane may be referred to as an x-y plane in which pixels in the texture images or depth maps are arrayed or rendered, whereas depths of pixels may be represented along a z-axis perpendicular to the x-y plane.

As the pixels in the pixel set are co-moving (e.g., with the same planar velocity, etc.), the image MV and depth diff generator (108) may obtain or compute the planar displacement of the pixels in the pixel set as a (vector) difference (e.g., row difference, column difference, a combination of row difference and column difference, etc.) between a first planar (row and column) position of a representative or group location (e.g., a symmetry location, a paracentral, an average pixel location of some or all pixels, etc.) of the pixel set in a first texture image of the two time adjacent texture images (or a corresponding first depth map of the two time adjacent depth maps) and a second planar (row and column) position of the same representative or group location of the same pixel set in a second texture image of the two time adjacent texture images (or a corresponding second depth map of the two time adjacent depth maps). For example, the first planar position of the representative or group location can be computed as a first averaged row position generated by averaging all row positions, in the first texture image (or the first depth map), of pixels in the pixel set and a first averaged column position generated by all column positions, in the first texture image (or the first depth map), of the pixels in the pixel set. Similarly, the second planar position of the representative or group location can be computed as a second averaged row position generated by averaging all row positions, in the second texture image (or the second depth map), of pixels in the pixel set and a second averaged column position generated by all column positions, in the second texture image (or the second depth map), of the pixels in the pixel set. To maintain accuracy in motion-compensated prediction or interpolation, fractional or floating point sample/pixel position values (e.g., with a precision of quarter sample, etc.) may be used to represent some or all of the representative or group locations/positions, the averaged row positions, the averaged column position, the planar displacement, etc.

Once the planar displacement is determined for the pixel set between two adjacent images or depth maps, a rate of planar displacement or velocity may be computed for the pixel set as the planar displacement divided by a difference between frame indexes of the two time adjacent images or depth maps, as the frame indexes represent respective (logical) time instances of the two time adjacent images or depth maps.

3. Depth Maps and Depth Diff Maps

Figure 2A:
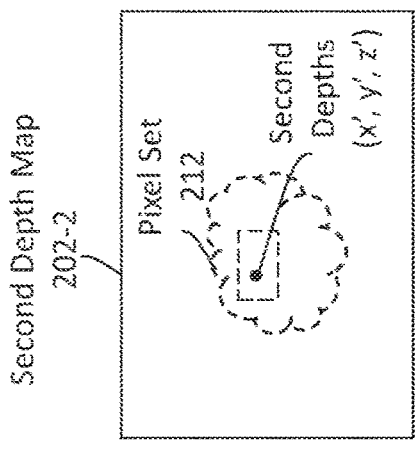
FIG. 2A illustrates two example depth maps.
Figure 2A:
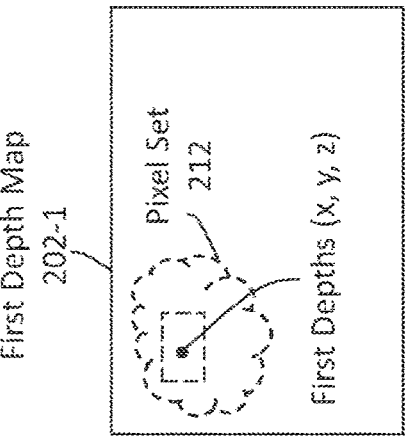

FIG. 2A illustrates two example depth maps that are composed of depths (or depth values) for pixels in two corresponding input texture images in the sequence of input texture images. For the purpose of illustration only, a first depth map 202-1 is composed of first depths for first pixels in a first input texture image, whereas a second depth map 202-2 is composed of second depths for second pixels in a second input texture image.

In some operational scenarios, the first input texture image and the second input texture image may belong to the same GOP, such as two time adjacent input texture images or two input texture images separated by one or more intervening input texture images. In some operational scenarios, the first input texture image and the second input texture image may belong to different GOPs in the sequence of input texture images, such as two I-frames starting two time adjacent GOPs.

As shown in FIG. 2A, (depth) pixels represented in each of the depth maps (202-1 and 202-2) or (texture) pixels represented in the corresponding input texture images may be arranged in a specific two-dimensional (2D) array pattern corresponding to a specific spatial resolution supported by the sequence of input texture images. A pixel set 212 may be identified—e.g., by similarity or dissimilarity in texture colors or patterns among spatially adjacent pixels, by mutually adjacent or relatively smooth varying depths among spatially adjacent pixels, etc.—in the first depth map (202-1) and the second depth map (202-2).

The pixel set (212) may be at first spatial locations indicated by first combinations of rows and columns in the first depth map (202-1) or the first input texture image, whereas the pixel set (212) may be at second (displaced) spatial locations indicated by second combinations of rows and columns in the second depth map (202-2) or the second input texture image.

By way of example but not limitation, the pixel set (212) in the first depth map (202-1) or the first input texture image may be composed of pixels (or the first pixels as previously mentioned) whose texture values in the first input texture image and whose depths in the first depth map (202-1) depict a specific image feature such as an eye of a human. Likewise, the pixel set (212) in the second depth map (202-2) or the second input texture image may be composed of pixels (or the second pixels as previously mentioned) whose texture values in the second input texture image and whose depths in the second depth map (202-2) depict the same specific image feature or the eye of the human.

The first pixels in the pixel set (212) of the first depth map (202-1) have one-to-one correspondence relationships with the second pixels in the pixel set (212) of the second depth map (202-1) albeit the first pixels and the second pixels depict the same specific image feature at two different time instances/points. For example, the specific image feature may include a specific visually perceptible image feature portion such as a corner of the eye. The specific visually perceptible image feature portion or the corner of the eye may be depicted by a first pixel at a first pixel location (x, y, z) in the first depth map (202-1) or the first input texture image corresponding to the first depth map (202-1). Likewise, the same specific visually perceptible image feature portion or the corner of the eye may be depicted by a second pixel at a second pixel location (x', y', z') in the second depth map (202-2) or the second input texture image corresponding to the second depth map (202-2). The second pixel in the second depth map (202-2) has a one-to-one correspondence relationship with the first pixel in the first depth map (202-1) as both the first and second pixels depict the same specific visually perceptible image feature portion or the corner of the eye albeit at the two different time instances/points.

A planar displacement of the pixel set (212) from the first time instance/point of the first depth map (202-1) to the second time instance/point of the second depth map (202-2)

may be determined or represented as (planar) differences (denoted as a combination of Δx and Δy) between some or all pairs of corresponding pixels in the pixel set (212) that have one-to-one correspondence relationships. For example, the planar displacement may be determined or represented as (planar) differences Δx and Δy between a pair of the first and second pixels (x, y, z) and (x', y', z') that have a one-to-one correspondence relationship, as follows:

$$\Delta x = x' - x \qquad (1)$$

$$\Delta y = y' - y \qquad (2)$$

A depth difference between first and second pixels in a pair of pixels having a one-to-one correspondence relationship in the first depth map (202-1) and the second depth map (202-2) may be determined or represented as a difference between depths of the first and second pixels along the depth direction or z-axis with a reference view/camera position as the origin of the x-y-z coordinate system. For example, a depth difference Δz between the first pixel (x, y, z) in the pixel set (212) of the first depth map (202-1) and the second pixel (x', y', z') in the pixel set (2120 of the second depth map (202-2) can be determined between depths z and z', as follows:

$$\Delta z = z' - z \qquad (3)$$

The image MV and depth diff generator (108) of FIG. 1A can store planar displacements and depth differences as derived from the sequence of depth maps and/or the sequence of input texture images into a sequence of depth difference maps.

Figure 2B:
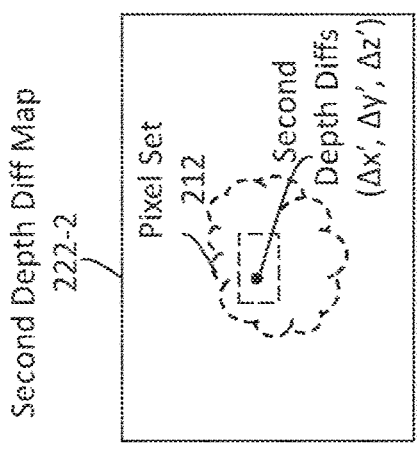
FIG. 2B illustrates two example depth diff maps.

FIG. 2B illustrates two example depth difference maps (or depth diff maps) that are composed of depth differences (or depth value differences) as well as planar differences for pixels in two corresponding input texture images in the sequence of input texture images. For the purpose of illustration only, a first depth diff map 222-1 is composed of first depth diffs and first planar displacements for the first pixels in the first input texture image, whereas a second depth diff map 222-2 is composed of second depth diffs and second planar displacements for the second pixels in the second input texture image.

The first depth diff map (222-1) may be generated to store first depth differences and first planar displacements generated from the first depth map (202-1) and the second depth map (202-2), and/or generated from the first input texture image and the second input texture image to which the first depth map (202-1) and the second depth map (202-2) respectively correspond. The second depth diff map (222-2) may be generated to store second depth differences and second planar displacements generated from the second depth map (202-2) and a third depth map (not shown) following the second depth map (202-2), and/or generated from the second input texture image and a third input texture image to which the second depth map (202-2) and the third depth map respectively correspond.

As shown in FIG. 2B, (depth diff) pixels represented in each of the depth diff maps (222-1 and 222-2) may be arranged in the same manner as in the corresponding input texture images such as in a specific two-dimensional (2D)

array pattern corresponding to a specific spatial resolution supported by the sequence of input texture images.

As the pixel set (212) is composed of pixels of co-moving pixels, the planar displacement as computed from one or more representative image feature portions of the specific image feature depicted in the pixel set (212) may represent an overall planar displacement for all pixels in the pixel set (212). Hence, in some implementations, there is no need to repeat this planar displacement by each and every pixel in the pixel set (212); in these implementations, only a single planar displacement can be used to represent the same planar displacement of all pixels in the same pixel set of co-moving pixels such as the pixel set (202) for the purpose of data compression efficiency. For example, in the first depth diff map (222-1), a planar displacement represented by a combination of Δx and Δy can be used to represent the same planar displacement of all pixels in the pixel set (212) of the first depth diff map (222-1) or of the first input texture image, albeit these pixels in the first depth diff map (222-1) may have different depth differences (or different Δz values) among themselves. Likewise, in the second depth diff map (222-2), a planar displacement represented by a combination of Δx' and Δy' can be used to represent the same planar displacement of all pixels in the pixel set (212) of the second depth diff map (222-2) or of the second input texture image, albeit these pixels in the second depth diff map (222-2) may have different depth differences (or different Δz' values) among themselves. As a result, while the depth diff maps as described herein include both planar displacements as well as depth differences, a total amount of data or data volume for the depth diff maps after compression/encoding may be comparable to a total amount of data or data volume for the corresponding depth maps after compression/encoding. As difference values tend to be smaller values than non-difference values, data redundancy and hence compression efficiency may be more likely to be found or achieved with the difference values in the depth diff maps than non-difference depth values in the depth maps.

The image and depth diff encoder (110) of FIG. 1A comprises software, hardware, a combination of software and hardware, etc., configured to process and encode the sequence of input texture images (102) and the sequence of depth diff maps into the video signal (112).

As noted, the sequence of (e.g., consecutive, sequential, etc.) input texture images (102) or an encoded/compressed version thereof can be partitioned, for example along a playback time direction, into the sequence of (e.g., consecutive, sequential, mutually exclusive, etc.) GOPs. Each GOP comprises a group of picture, which is a group of encoded images (e.g., intra-predicted images, inter-predicted images, etc.) derived from, or corresponding to, a respective group of input texture images in the sequence of input texture images.

Each GOP in the sequence of GOPs begins with a respective I-frame (or an intra-predicted image) in a sequence of I-frames and ends with a frame (or an encoded/compressed version of a corresponding input texture image in the sequence of input texture images) before the next I-frame that begins or initiates the next GOP in the sequence of GOPs.

4. Derivation of Motion Parameters

Figure 3A:
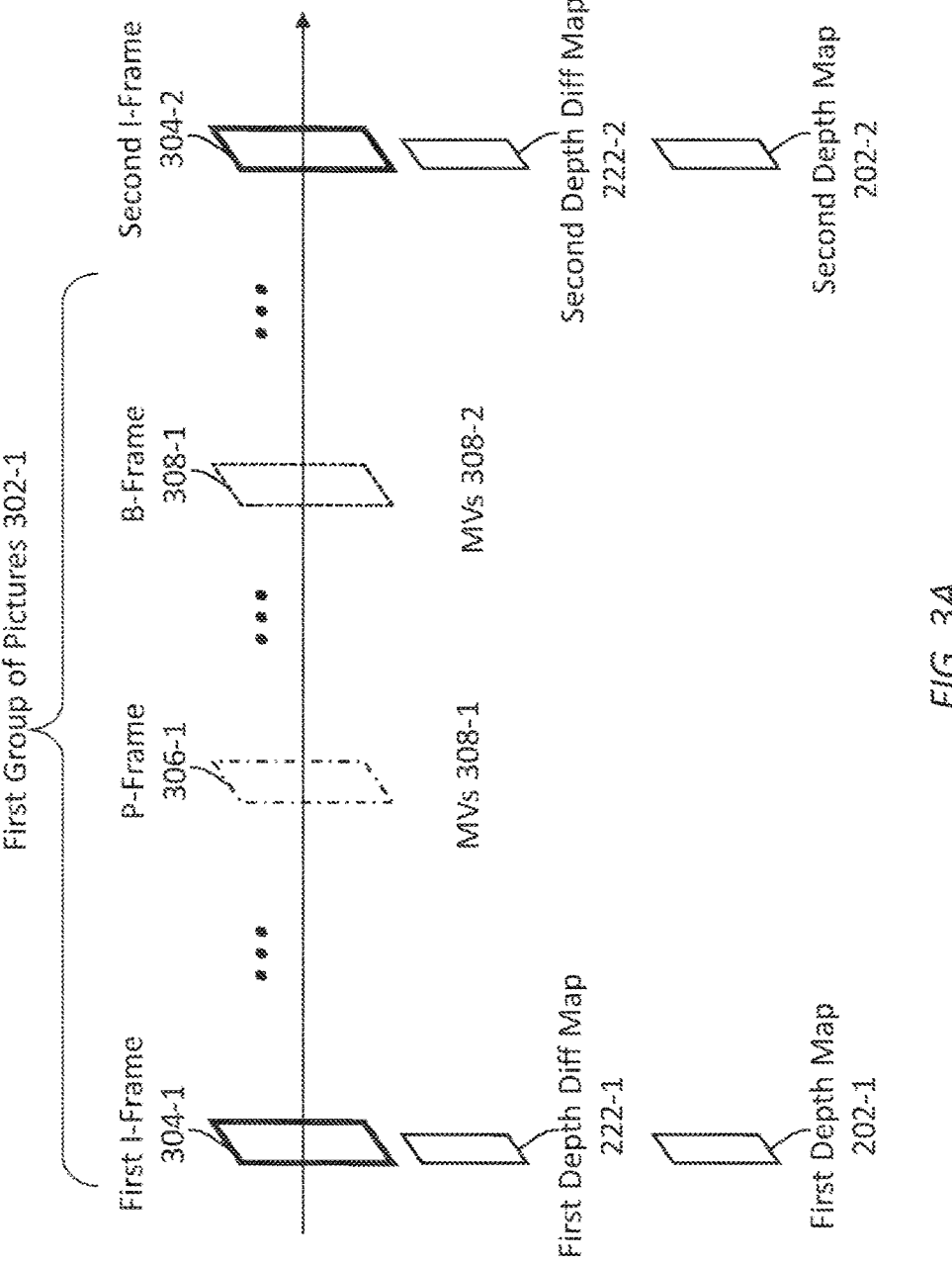
FIG. 3A and FIG. 3B illustrate two example groups of pictures.
Figure 3B:
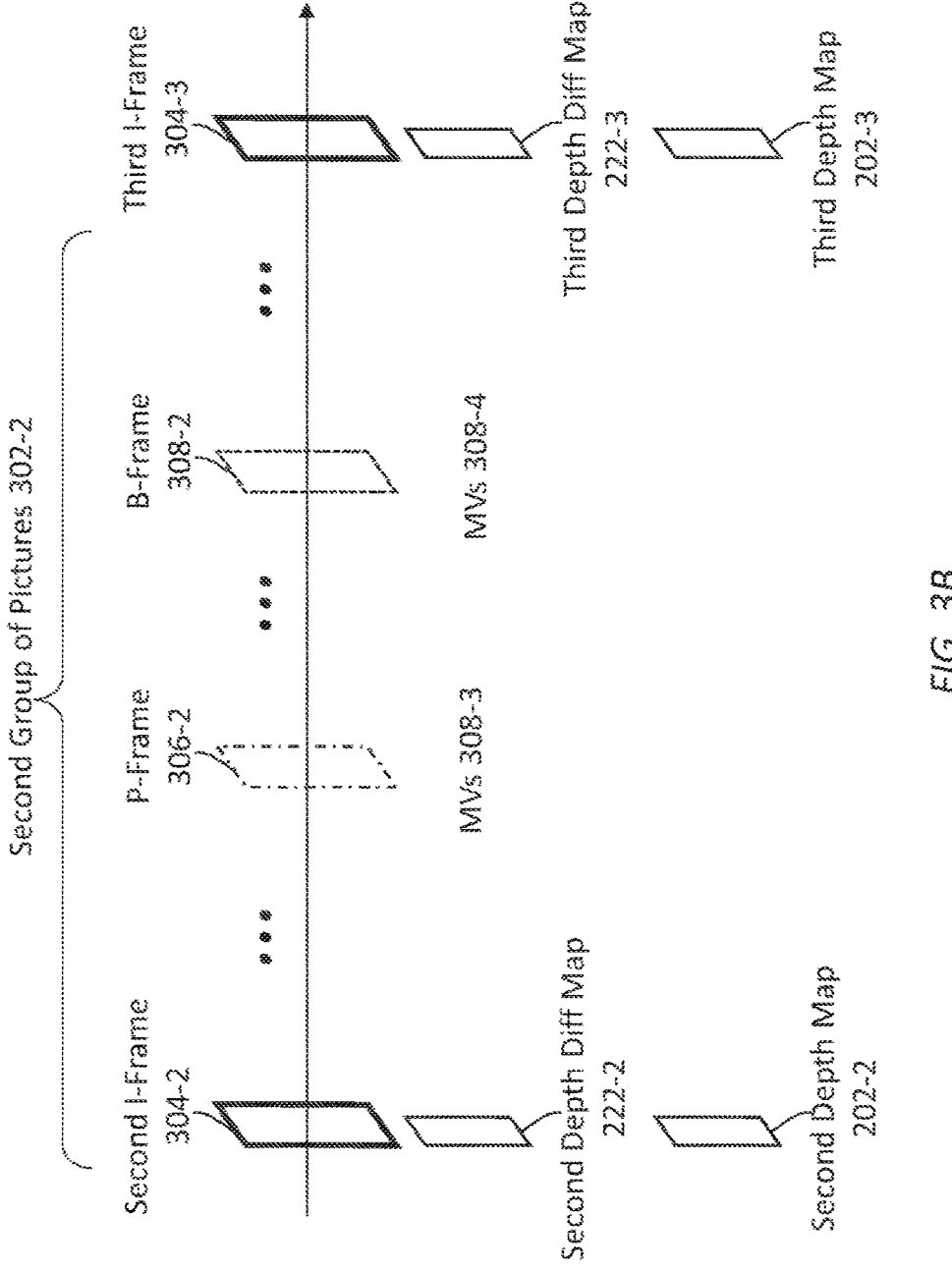

FIG. 3A and FIG. 3B illustrate two example GOPs: a first GOP 302-1 and a second (or the next) GOP 302-2 that immediately follows the first GOP (302-1). As illustrated in FIG. 3A, the first GOP (302-1) includes a group of encoded images corresponding to a first group of input texture images in the sequence of input texture images (102) and begins with a first I-frame 304-1 followed by a combination of zero or more first P-frames (e.g., 306-1, etc.) and/or zero or more first B-frames (e.g., 308-1, etc.), etc., up to a frame right before a second I-frame which is the next I-frame (after the first I-frame (304-1)) that begins the next GOP (after the first GOP (302-1)) or the second GOP (302-2). As illustrated in FIG. 3B, the second GOP (302-2) includes a group of encoded images corresponding to a second group of input texture images following the first group of input texture images in the sequence of input texture images (102) and begins with the second I-frame (304-2) followed by a combination of zero or more second P-frames (e.g., 306-2, etc.) and/or zero or more second B-frames (e.g., 308-2, etc.), etc., up to a frame right before a third I-frame which is the next I-frame (after the second I-frame (304-2)) that begins the next GOP (after the second GOP (302-2)).

Each encoded image in a GOP may be generated from a respective input texture image in a group of input texture images corresponding to the GOP by the image and depth diff encoder (110) of FIG. 1A. A quadtree structure (e.g., a nested quadtree, etc.) may be adaptively determined or used to partition or divide the encoded image into a plurality of rectangle image blocks of varying sizes or sub-division levels. An image block as described herein may refer to: an image macroblock, an image block, an image sub-block, a coding tree unit, a coding tree block, a coding tree node, etc. The quadtree structure may be specified or defined in accordance with one or more normative or informative passages set forth in a standard-based or proprietary video coding specification (e.g., H.264/AVC, H.265/HEVC, H.266/VVC, etc.).

The quadtree structure for the encoded image of the GOP may be selected using an adaptive quadtree selection algorithm based on one or more quadtree structure selection factors or a tradeoff thereof. Example quadtree structure selection factors may, but are not necessarily limited to only, relate to some or all of: maximizing compression or coding efficiency, reducing bitrate usages, minimizing coding or prediction errors, reducing visual artifacts, minimizing transmission and/or processing delays, etc.

The plurality of image blocks constituting the encoded image may include two types of blocks: prediction blocks and transform blocks. A prediction block as described herein may comprise samples generated from intra-prediction of previously decoded samples in the encoded image, or samples generated from inter-prediction or motion-compensated prediction (MCP) of previously decoded samples of a reference image block in a reference image. A transform block as described herein may comprise samples with non-predicted sample values or transform coefficients (e.g., digital cosine transform or DCT coefficients, etc.). Differences or residuals between predicted sample values from inter- or intra-prediction in a prediction block of the encoded image and sample values derived from a corresponding image block of the respective input texture image can be coded in the video signal (112) in a residual image block of a residual image corresponding to the prediction block of the encoded image.

A prediction block or an inter-predicted block generated with MCP or motion vector prediction may apply motion compensated prediction with one or more sets of motion parameters each of which may include a reference image/frame index and a motion vector. Thus, for an image (e.g., P-frame, B-frame, etc.) having numerous (e.g., tens of thousands per image, etc.) inter-predicted blocks located in different spatial regions of the image, correspondingly numerous sets of motion parameters representing a motion vector field in these different spatial regions of the image are used to perform image processing operations for MCP or motion prediction.

Under other MCP or inter-prediction approaches that do not implement techniques as described herein, numerous sets of motion parameters would be encoded or carried, for example using lossless data compression, in a video signal just to encode texture images into the video signal. In addition, depth maps for the texture images would also be encoded into the video signal to provide depth information for pixels represented in the texture images. As a result, a relatively large bitrate would be used to carry both the motion parameters and the depth information for the texture images in the video signal.

In contrast, motion parameters used to generate encoded texture images do not need to be transmitted with the encoded texture images in a video signal (e.g., 112 of FIG. 1A, etc.). Rather, the motion parameters used to generate encoded texture images can be generated or regenerated from depth diff maps as described herein by an upstream device such as a video encoder that encodes the encoded image into the video signal (112) as well as by a recipient downstream device of the video signal (112). In addition, depth information for pixels represented in the encoded texture images in the video signal (112) can be generated or regenerated from the same depth diff maps by the upstream device as well as by the recipient downstream device. As a result, a relatively large saving of bitrate can be obtained or achieved under techniques as described herein to carry the encoded texture images with the depth diff maps in the video signal (112) freed from carrying the motion parameters. Additionally, optionally or alternatively, further compression efficiency may be obtained or achieved by encoding the depth diff maps having relatively small numeric values-which may be comparable to data sizes of residuals in the encoded texture images-instead of directly encoding depth maps having relatively large numeric values into the video signal (112). Additionally, optionally or alternatively, processing accuracy and efficiency may be obtained, achieved or compensated under techniques as described herein by freeing upstream and downstream devices from performing some or all of image processing operations relating to optimizing motion parameters or prediction related operational parameters. In the meantime, these techniques also enable a wide range of available video codecs to continue to operate and perform MCP or motion vector prediction with motion parameters that can be derived indirectly from depth diff maps, rather than directly from coded motion parameters in the video signal (112).

As shown in FIG. 3A, the first GOP (302-1) includes a first encoded image represented by a first P-frame 306-1 and a second encoded image represented by a first B-frame 308-1, etc. The first P-frame (306-1) may include a first plurality of image blocks encoded in accordance with a first quadtree structure for the first P-frame (306-1), whereas the first B-frame (308-1) may include a second plurality of image blocks encoded in accordance with a second quadtree structure for the first B-frame (308-1). The first plurality of image blocks in the first P-frame (306-1) may include first inter-predicted image blocks in which samples are predicted based in part or in whole on a first motion vector field specified by first MVs 308-1, whereas the second plurality of image blocks in the first B-frame (308-1) may include second inter-predicted image blocks in which samples are predicted based in part or in whole on a second motion vector field specified by second MVs 308-2.

Similarly, as shown in FIG. 3B, the second GOP (302-2) includes a third encoded image represented by a second P-frame 306-2 and a fourth encoded image represented by a second B-frame 308-2, etc. The second P-frame (306-2) may include a third plurality of image blocks encoded in accordance with a third quadtree structure for the second P-frame (306-2), whereas the second B-frame (308-2) may include a fourth plurality of image blocks encoded in accordance with a fourth quadtree structure for the second B-frame (308-2). The third plurality of image blocks in the second P-frame (306-2) may include third inter-predicted image blocks in which samples are predicted based in part or in whole on a third motion vector field specified by third MVs 308-3, whereas the fourth plurality of image blocks in the second B-frame (308-2) may include fourth inter-predicted image blocks in which samples are predicted based in part or in whole on a fourth motion vector field specified by fourth MVs 308-4.

Under techniques as described herein, motion parameter sets such as motion vectors and/or reference image/frame indexes can be generated from depth diff maps. For example, the first MVs (308-1) and the second MVs (308-2) as shown in FIG. 3A may be generated from one or both of the first depth diff map (222-1) generated for the first I-frame (304-1) of the first GOP (302-1) and the second depth diff map (222-2) generated for the second I-frame (304-2) of the second GOP (302-2). Similarly, the third MVs (308-3) and the fourth MVs (308-4) as shown in FIG. 3B may be generated from one or both of the second depth diff map (222-2) and the third depth diff map (222-3) generated for a third I-frame 304-3 of a third GOP (not shown) following the second GOP (302-2).

In some operational scenarios, the image and depth diff encoder (110) of FIG. 1A can use the pixel sets of contiguous and co-moving pixels and planar displacements for the pixel sets as indicated in or with the first depth diff map (222-1) for the first I-frame (304-1) to determine displaced pixel sets of contiguous and co-moving pixels in the first P-frame (306-1).

In response to determining the displaced pixel sets in the first P-frame (306-1), the image and depth diff encoder (110) of FIG. 1A can further determine whether each of some or all image blocks in the first plurality of image blocks or sample values therein can be predicted from a decoded image block or decoded sample values therein in a pixel set of the first I-frame (304-1).

For the purpose of illustration only, the image and depth diff encoder (110) of FIG. 1A determines that a specific image block in the first plurality of image blocks or sample values therein can be predicted from a specific decoded image block or decoded sample values therein in the pixel set (212) of the first I-frame (304-1) as shown in FIG. 2B. As the pixel set (212) has a planar displacement ($\Delta x$, $\Delta y$), the specific image block in the pixel set (212) also has the same planar displacement ($\Delta x$, $\Delta y$).

The planar displacement ($\Delta x$, $\Delta y$) of the specific image block in the pixel set (212) represents a spatial position difference between a first spatial position of a representative pixel (e.g., the top leftmost pixel, etc.) of the specific image block at a first time point indicated by a first frame index of the first I-frame (304-1) to a second spatial position of the same representative pixel (e.g., the top leftmost pixel, etc.) of the specific image block at a second time point indicated by a second frame index of the second I-frame (304-2).

The image and depth diff encoder (110) of FIG. 1A can use the planar displacement ($\Delta x$, $\Delta y$) of the specific image block indicated in the first depth diff map (222-1) as a motion vector in the first MVs (308-1) for the first P-frame (306-1). Additionally, optionally or alternatively, an interpolated version of the planar displacement ($\Delta x$, $\Delta y$) can be derived specifically for the first P-frame (306-1) as a motion vector in the first MVs (308-1) for the first P-frame (306-1). The interpolated version of the planar displacement specifically for the first P-frame (306-1) may be obtained by interpolating based at least in part on some or all of the first frame index of the first I-frame (304-1) in the first GOP (302-1), the second frame index of the second I-frame (304-2) of the second GOP (302-2), a frame index of the first P-frame (306-1) in the first GOP (302-1), etc.

Also, the image and depth diff encoder (110) of FIG. 1A can use the planar displacement ($\Delta x$, $\Delta y$) of the specific image block indicated in the first depth diff map (222-1) as a motion vector in the second MVs (308-2) for the first B-frame (308-1). Additionally, optionally or alternatively, an interpolated version of the planar displacement ($\Delta x$, $\Delta y$) can be derived specifically for the first B-frame (308-1) as a motion vector in the MVs (308-2) for the first B-frame (308-1). The interpolated version of the planar displacement specifically for the first B-frame (308-1) may be obtained by interpolating based at least in part on some or all of the first frame index of the first I-frame (304-1) in the first GOP (302-1), the second frame index of the second I-frame (304-2) of the second GOP (302-2), a frame index of the first B-frame (308-1) in the first GOP (302-1), etc.

In some operational scenarios, to support (e.g., legacy, already deployed, etc.) video codecs that operate with or depend on motion vectors or motion parameters as defined in specific standard-based or proprietary video coding specifications, the image and depth diff encoder (110) of FIG. 1A can generate, from planar displacements of pixel sets in depth diff maps, these motion vectors or motion parameters in specific formats or representations as defined in the specific video coding specifications to enable these video codecs to perform MCP or motion vector prediction operations depending on motion vectors or motion parameters in these formats or representations. Additionally, optionally or alternatively, the image and depth diff encoder (110) of FIG. 1A can generate a video signal using video coding syntaxes to include the motion vectors and/or motion parameters generated or derived from the planar displacements of the pixel sets in the depth diff maps in the video signal.

In some operational scenarios, to support (e.g., updated, modified, enhance, etc.) video codecs that does not depend on motion vectors or motion parameters as defined in specific standard-based or proprietary video coding specifications, the image and depth diff encoder (110) of FIG. 1A does not generate, from planar displacements of pixel sets in depth diff maps, these motion vectors or motion parameters in specific formats or representations as defined in the specific video coding specifications. These video codecs may use the planar displacements of the pixel sets of the depth diff maps directly or indirectly to perform MCP or motion vector prediction operations without needing to generate the motion vectors or motion parameters in the specific formats or representations defined in the coding specifications. In an example, some or all of the video codecs can directly use the planar displacements of the depth diff maps to perform MCP or motion vector prediction operations. In another example, some or all of the video codecs can use the planar displacements of the depth diff maps to generate the motion vectors or motion parameters in internal or informal formats (e.g., with a higher precision than integer precisions specified in the standards, etc.) and to use these motion vectors or motion parameters in the internal or informal formats to perform MCP or motion vector prediction operations.

Additionally, optionally or alternatively, the image and depth diff encoder (110) of FIG. 1A can generate a video signal such as 112 of FIG. 1A using video coding syntaxes to exclude some or all the motion vectors and/or motion parameters generated or derived from the planar displacements of the pixel sets in the depth diff maps in the video signal (112).

As used herein, video content in a video signal (or stream) as described herein may include, but are not necessarily limited to, any of: audiovisual programs, movies, video programs, TV broadcasts, computer games, augmented reality (AR) content, virtual reality (VR) content, automobile entertainment content, etc.

As used herein, a "image and depth diff data server" may refer to one or more upstream devices, video encoders and/or video streaming servers that prepare and stream video content to one or more video streaming clients such as video decoders in order to render at least a portion of the video content on one or more displays. The displays on which the video content is rendered may be part of the one or more video streaming clients, or may be operating in conjunction with the one or more video streaming clients.

Example image and depth diff data servers may include, but are not necessarily limited to, any of: cloud-based image and depth diff data servers located remotely from video streaming client(s), video streaming servers connected with video streaming client(s) over local wired or wireless networks, VR devices, AR devices, automobile entertainment devices, digital media devices, digital media receivers, set-top boxes, gaming machines (e.g., an Xbox), general purpose personal computers, tablets, dedicated digital media receivers such as the Apple TV or the Roku box, etc.

The image and depth diff data server (100) may be used to support AR applications, VR applications, 360 degree video applications, volumetric video applications, real time video applications, near-real-time video applications, non-real-time omnidirectional video applications, automobile entertainment, helmet mounted display applications, heads up display applications, games, 2D display applications, 3D display applications, multi-view display applications, etc.

Figure 1B:
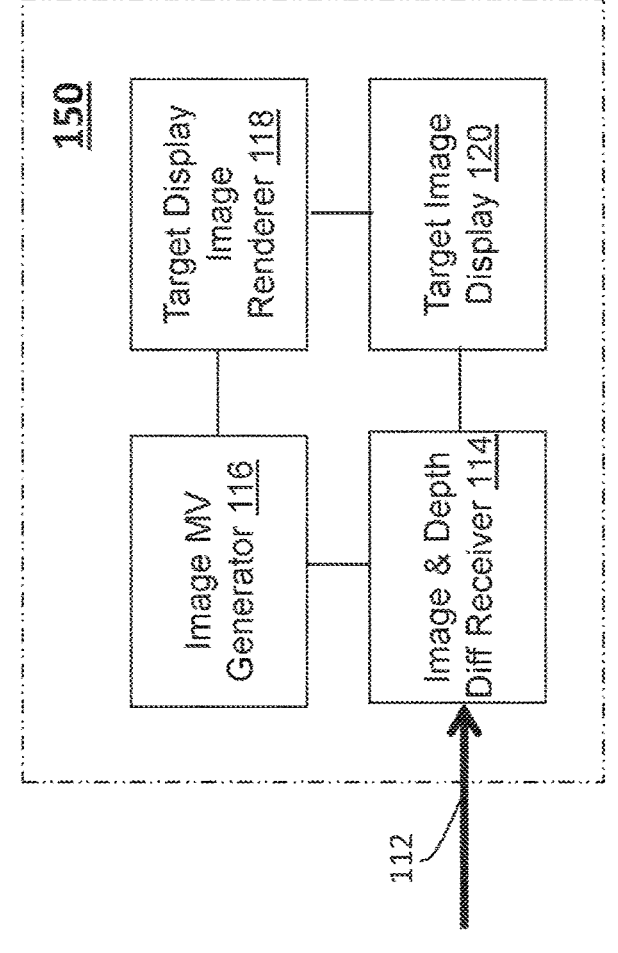
FIG. 1B illustrates an example downstream recipient device.

FIG. 1B illustrates an example downstream recipient device such as a video client device 150 that comprises an image and depth diff receiver 114, an image MV generator 116, a target display image renderer 118, a target image display 120, etc. Some or all of the components of the video client device (150) may be implemented by one or more devices, modules, units, etc., in software, hardware, a combination of software and hardware, etc.

Example video client devices as described herein may include, but are not necessarily limited to only, any of: big screen image displays, home entertainment systems, set-top boxes and/or audiovisual devices operating with image displays, mobile computing devices handheld by users/viewers (e.g., in spatially stable or varying relationships with eyes of the users/viewers, etc.), wearable devices that include or operate with image displays, computing devices including or operating with head mounted displays or heads-up displays, etc.

The video streaming client (150) or the image and depth diff receiver (114) therein comprises software, hardware, a combination of software and hardware, etc., configured to receive a video signal or bitstream (e.g., 112, etc.) that is encoded with a sequence of (e.g., consecutive, sequential, logically ordered by frame indexes, etc.) encoded images and a sequence of (e.g., consecutive, sequential, logically ordered by frame indexes, etc.) depth diff maps corresponding to the sequence of encoded images. The sequence of encoded images may include, or has been partitioned by an upstream device (e.g., 100 of FIG. 1A, etc.) into, a sequence of GOPs, each of which begins with an I-frame (or an intra-predicted encoded image) in a sequence of I-frames followed by one or more P- or B-frames (or one or more inter-predicted encoded images).

In some operational scenarios, each depth diff map in the sequence of depth diff maps corresponds to, and has been generated by the upstream device (100) for, a respective encoded image in the sequence of encoded images. In some operational scenarios, each depth diff map in the sequence of depth diff maps corresponds to, and has been generated by an upstream device for, a respective I-frame in the sequence of I-frames.

In some operational scenarios, the upstream device (100) may partition the sequence of depth diff maps into a plurality of (e.g., consecutive, sequential, mutually exclusive, etc.) sub-sequences of depth diff maps. For example, the plurality of sub-sequences of depth diff maps may have one-to-one mapping relationships with a plurality of (e.g., consecutive, sequential, mutually exclusive, etc.) sub-sequences of GOPs partitioned from the sequence of GOPs. Each sub-sequence of depth diff maps in the plurality of sub-sequences of depth diff maps may correspond to a respective sub-sequence of GOPs in the plurality of GOPs and may depict the same or similar visual scene with relatively slow changes in planar displacements of pixel sets represented in the sub-sequence of depth diff maps.

Each sub-sequences of depth diff maps may include multiple depth diff maps, for example corresponding to multiple GOPs in a respective sub-sequence of GOPs. The multiple depth diff maps in the sub-sequence of depth diff maps may include a specific depth diff map such as the very first depth diff map in the sub-sequence of depth diff maps. As encoded in the video signal (112), the specific depth diff map in the sub-sequence of depth diff maps can carry or include a combination of planar displacements of pixels sets and depths of pixels in the pixel sets for a corresponding encoded image (e.g., an I-frame such as the very first I-frame in a sub-sequence of I-frames corresponding to the respective GOP, etc.) derived from a corresponding input texture image. Each other depth diff map in the sub-sequence of depth diff maps may carry or include a combination of other planar displacements of other pixels sets and depth diffs of other pixels in the other pixel sets in relation to the depths carried in the specific depth diff map for another corresponding encoded image (e.g., another I-frame such as the second or later I-frame in the sub-sequence of I-frames corresponding to the respective GOP, etc.) derived from another corresponding input texture image.

The recipient device (150) can use the depths in the specific depth diff map in the sub-sequence of depth diff maps as references to derive other depths for the next other corresponding encoded image by adding depth diffs in the next other depth diff map to the references or the depths in the specific depth diff map. The other depths may then be set as the new or current references for the second next depth diff map to derive the second next other depths. This process may be repeated for all the other diff maps in the same sub-sequence of depth diff maps. As a result, the downstream recipient device (150) can recover all depths for pixels represented in the received depth diff maps. These depths can be used in 2D or 3D image processing and/or rendering operations including image warping operations, stereoscopic image rendering, multi-view rendering, immersive image display applications, AR or VR image rendering, etc.

The image MV generator (116) comprises software, hardware, a combination of software and hardware, etc., configured to implement interpolation and/or extrapolation operations to generate, from the depth diff maps for the sequence of encoded images, motion vectors or motion parameters in the same manner as how the same motion vectors or motion parameters are generated by the upstream device (100) as part of generating and encoding the sequence of encoded images or the sequence of GOPs into the video signal (100). The image MV generator (116) can use these motion vectors or motion parameters to perform MCP or motion vector prediction operations to generate predicted sample values for image blocks in the encoded images. These predicted sample values may be added with residuals decoded from the video signal (112) for these image blocks to generate reconstructed image blocks of a sequence of (e.g., consecutive, sequential, etc.) reconstructed images.

The target display image renderer (118) comprises software, hardware, a combination of software and hardware, etc., configured to receive the sequence of reconstructed images, generate a sequence of (e.g., consecutive, sequential, etc.) display images from the sequence of reconstructed images, and render the sequence of display images on the target image display (120) for or at a plurality of time points respectively covered by the sequence of encoded images in the video signal (112).

Figure 1C:
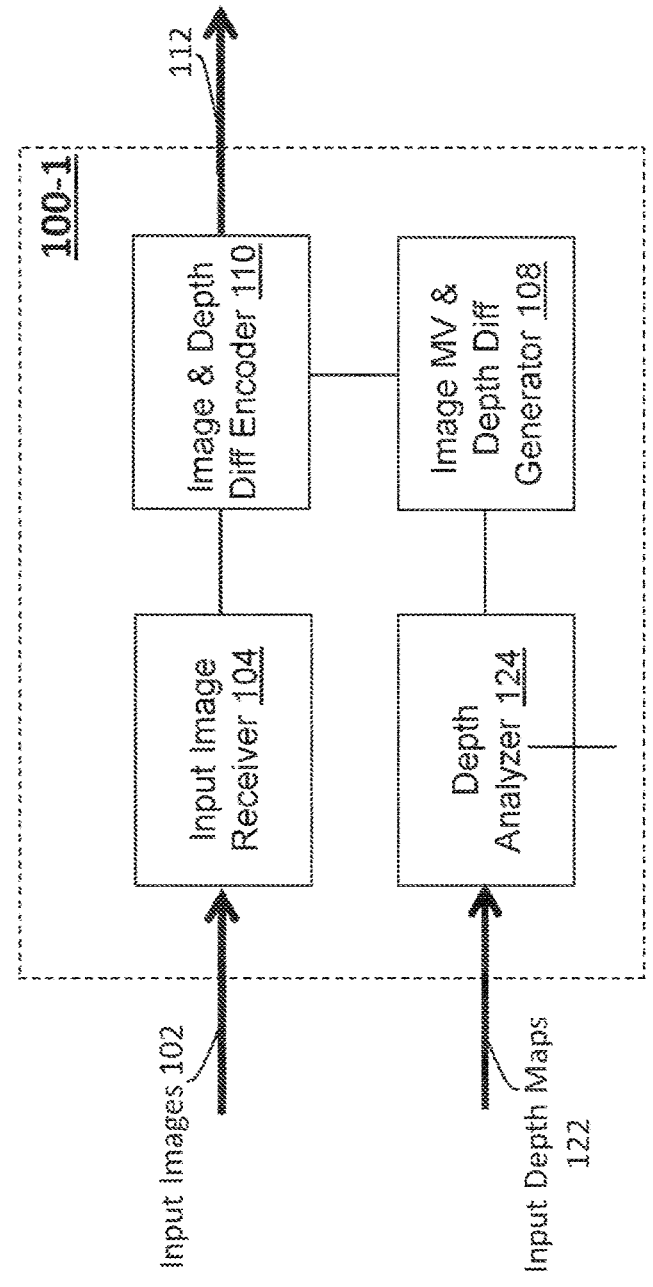

For the purpose of illustration only, it has been described that depth information such as individual depths of some or all pixels represented in an input texture image can be obtained or generated by an upstream device (e.g., 100 of FIG. 1A, etc.) from performing image analysis operations on the input texture image or adjacent input texture image(s). It should be noted that, in other embodiments, as illustrated in FIG. 1C, depth information may be provided, to an upstream device (e.g., 100-1, etc.) with a sequence of input texture images (e.g., 104, etc.) as well as a sequence of input depth maps (e.g., 122, etc.) corresponding to the sequence of input texture images (104) for the purpose of performing depth diff related image processing operations as described herein including generating an video signal (e.g., 112, etc.) that is encoded with a sequence of encoded images and a sequence of depth diff maps for the sequence of encoded images.

5. Example Process Flows

Figure 4A:
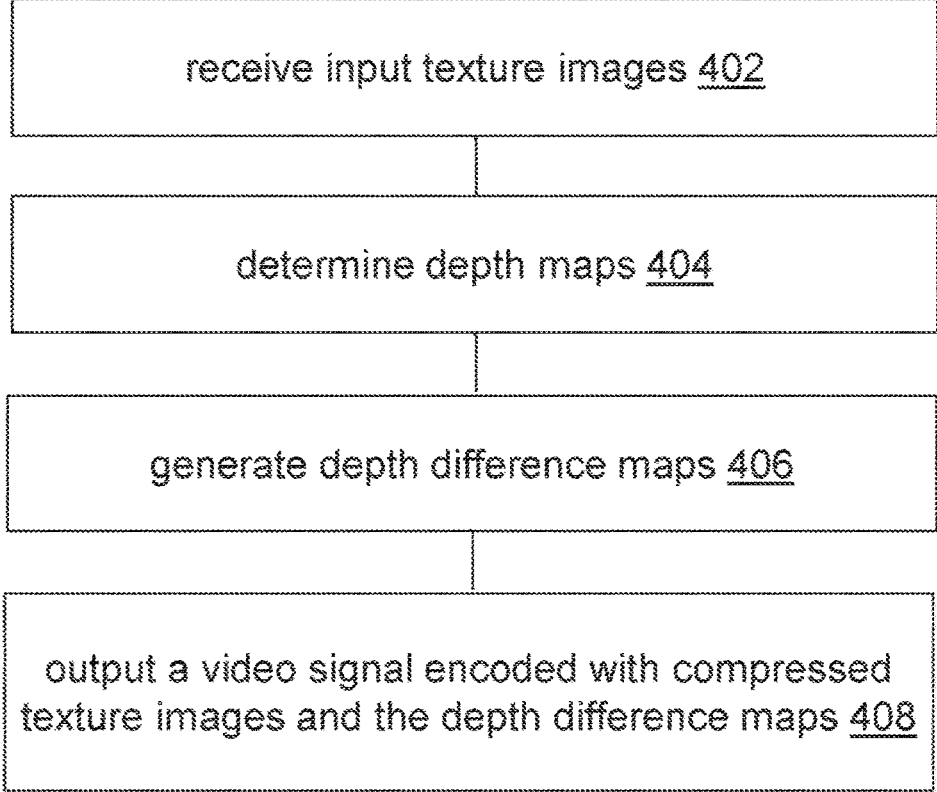

FIG. 4A illustrates an example process flow according to an example embodiment of the present invention. In some example embodiments, one or more computing devices or components may perform this process flow. In block 402, an image processing device (e.g., an upstream device, an encoder device, a transcoder, a media streaming server, etc.) receives a sequence of input texture images.

In block 404, the image processing device determines a sequence of depth maps for the sequence of input texture images, each depth map in the sequence of depth maps including depth values of a plurality of pixels represented in a corresponding input texture image in the sequence of input texture images.

In block 406, the image processing device generates a sequence of depth difference maps from the sequence of depth maps, the sequence of depth difference maps including at least one depth difference map that is generated from two successive depth maps in the sequence of depth maps.

In block 408, the image processing device outputs a video signal encoded with a compressed version of the sequence of input texture images and the sequence of depth difference maps, the video signal causing a recipient device of the video signal to generate a sequence of display images from the compressed version of the sequence of input texture images and the sequence of depth difference maps for rendering on an image display.

In an embodiment, the sequence of input texture images is partitioned into a sequence of groups of pictures (GOPs); each depth difference map in the sequence of depth difference maps is generated for a respective GOP in the sequence of GOPs.

In an embodiment, the depth difference map includes depth value differences between first depth values in a first I-frame of the respective GOP and second depth values in a second I-frame of a subsequent GOP, in the sequence of GOPs, following the respective GOP.

In an embodiment, the plurality of pixels in the corresponding input texture images includes one or more pixel sets of contiguous and co-moving pixels.

In an embodiment, the sequence of depth difference maps includes a specific depth difference map that include one or more planar displacements for the one or more pixel sets in the plurality of pixels; each planar displacement in the one or more planar displacements is for a respective pixel set in the one or more pixel sets.

In an embodiment, the compressed version of the sequence of input texture images includes a plurality of inter-predicted encoded images; the plurality of inter-predicted encoded images includes an inter-predicted encoded image having one or more inter-predicted image blocks; samples in each of the one or more inter-predicted image blocks are predicted based on motion parameters generated from planar displacements included in at least one depth difference map in the sequence of depth difference maps.

In an embodiment, the video signal excludes motion parameters used in inter-predicted image blocks in the compressed version of the sequence of input texture images.

In an embodiment, the video signal excludes the sequence of depth maps used to generate the sequence of depth difference maps.

In an embodiment, the sequence of depth maps is generated through image analysis operations performed on the sequence of input texture images by an upstream device that receives the sequence of input texture images.

In an embodiment, the sequence of depth maps is received by an upstream device that receives the sequence of input texture images.

FIG. 4B illustrates an example process flow according to an example embodiment of the present invention. In some example embodiments, one or more computing devices or components may perform this process flow. In block 452, a recipient device retrieves, from a video signal, a sequence of encoded image, the sequence of encoded image representing a compressed version of a sequence of input texture images, the sequence of input texture images having been used by an upstream device to generate the sequence of encoded images encoded in the video signal.

In block 454, the recipient device retrieves, from the video signal, a sequence of depth difference maps, the sequence of depth difference maps having been generated by the upstream device from a sequence of depth maps determined for the sequence of input texture images.

In block 456, the recipient device causes a sequence of display images derived from the sequence of encoded images and the sequence of depth difference maps to be rendered on an image display.

In an embodiment, the video signal is encoded with residual values of inter-predicted image blocks in a plurality of inter-predicted encoded images in the sequence of encoded images.

In an embodiment, motion parameters for predicting samples in the inter-predicted image blocks are generated from the sequence of depth difference maps.

In various example embodiments, an apparatus, a system, an apparatus, or one or more other computing devices performs any or a part of the foregoing methods as described. In an embodiment, a non-transitory computer readable storage medium stores software instructions, which when executed by one or more processors cause performance of a method as described herein.

Note that, although separate embodiments are discussed herein, any combination of embodiments and/or partial embodiments discussed herein may be combined to form further embodiments.

6. Implementation Mechanisms—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
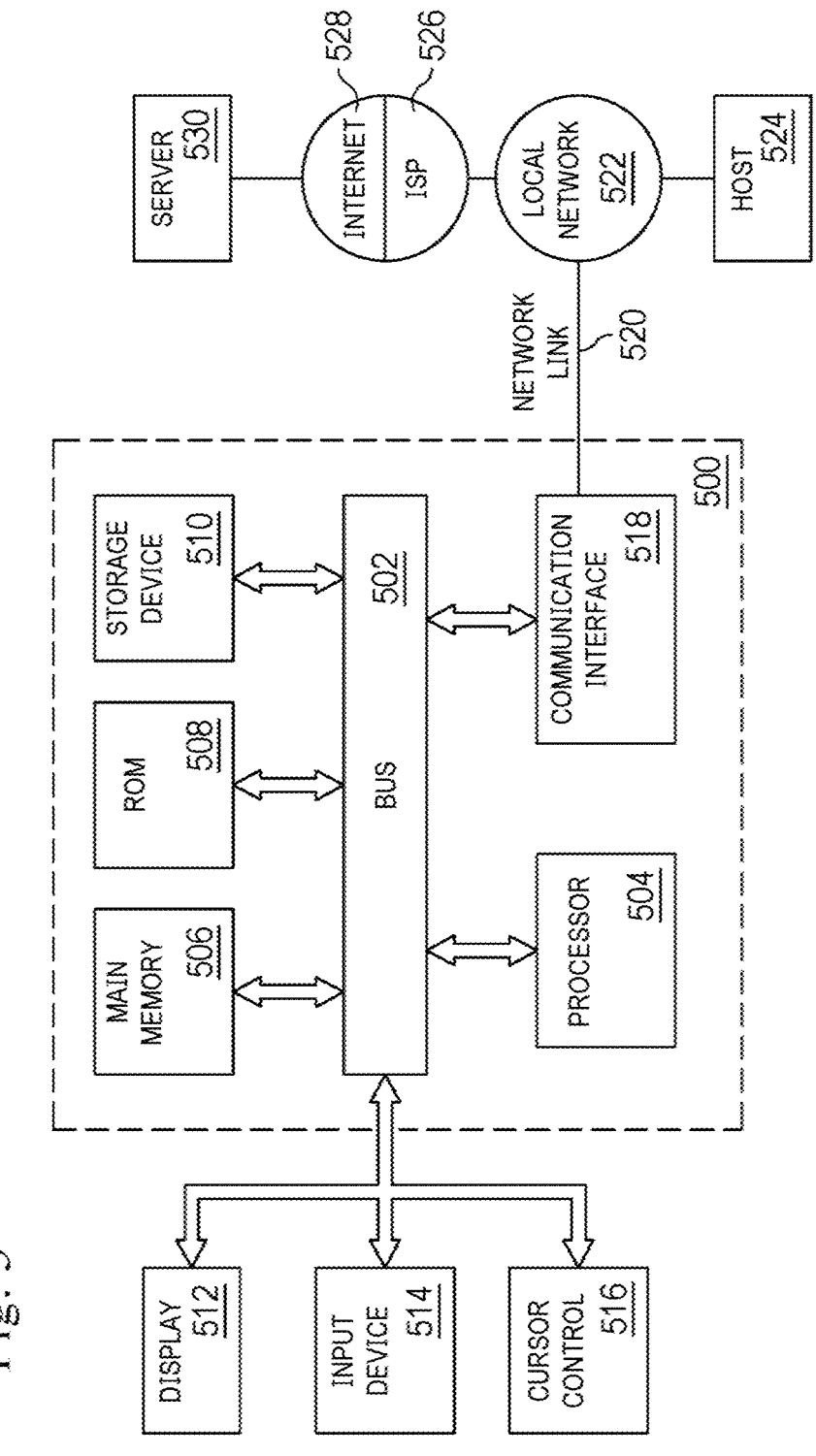
FIG. 5 illustrates an example hardware platform on which a computer or a computing device as described herein may be implemented.

For example, FIG. 5 is a block diagram that illustrates a computer system 500 upon which an example embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504.

A storage device 510, such as a magnetic disk or optical disk, solid state RAM, is provided and coupled to bus 502 for storing information and instructions.

Computer system 500 may be coupled via bus 502 to a display 512, such as a liquid crystal display, for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

7. Equivalents, Extensions, Alternatives and Miscellaneous

In the foregoing specification, example embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

Various aspects of the present invention may be appreciated from the following enumerated example embodiments (EEEs):

EEE 1. A method comprising:
receiving a sequence of input texture images;
determining a sequence of depth maps for the sequence of input texture images, wherein each depth map in the sequence of depth maps includes depth values of a plurality of pixels represented in a corresponding input texture image in the sequence of input texture images;
generating a sequence of depth difference maps from the sequence of depth maps, wherein the sequence of depth difference maps includes at least one depth difference map that is generated from two successive depth maps in the sequence of depth maps;
outputting a video signal encoded with a compressed version of the sequence of input texture images and the sequence of depth difference maps, wherein the video signal causes a recipient device of the video signal to generate a sequence of display images from the compressed version of the sequence of input texture images and the sequence of depth difference maps for rendering on an image display.

EEE 2. The method of EEE 1, wherein the sequence of input texture images is partitioned into a sequence of groups of pictures (GOPs), wherein each depth difference map in the sequence of depth difference maps is generated for a respective GOP in the sequence of GOPs.

EEE 3. The method of EEE 1 or 2, wherein the depth difference map includes depth value differences between first depth values in a first I-frame of the respective GOP and second depth values in a second I-frame of a subsequent GOP, in the sequence of GOPs, following the respective GOP.

EEE 4. The method of any of EEEs 1-3, wherein the plurality of pixels in the corresponding input texture images includes one or more pixel sets of contiguous and co-moving pixels.

EEE 5. The method of any of EEEs 1-4, wherein the sequence of depth difference maps includes a specific depth difference map that include one or more planar displacements for the one or more pixel sets in the plurality of pixels; wherein each planar displacement in the one or more planar displacements is for a respective pixel set in the one or more pixel sets.

EEE 6. The method of any of EEEs 1-5, wherein the compressed version of the sequence of input texture images includes a plurality of inter-predicted encoded images; wherein the plurality of inter-predicted encoded images includes an inter-predicted encoded image having one or more inter-predicted image blocks; wherein samples in each of the one or more inter-predicted image blocks are predicted based on motion parameters generated from planar displacements included in at least one depth difference map in the sequence of depth difference maps.

EEE 7. The method of any of EEEs 1-6, wherein the video signal excludes motion parameters used in inter-predicted image blocks in the compressed version of the sequence of input texture images.

EEE 8. The method of any of EEEs 1-7, wherein the video signal excludes the sequence of depth maps used to generate the sequence of depth difference maps.

EEE 9. The method of any of EEEs 1-8, wherein the sequence of depth maps is generated through image analysis operations performed on the sequence of input texture images by an upstream device that receives the sequence of input texture images.

EEE 10. The method of any of EEEs 1-9, wherein the sequence of depth maps is received by an upstream device that receives the sequence of input texture images.

EEE 11. A method comprising:

retrieving, from a video signal, a sequence of encoded image, wherein the sequence of encoded image represents a compressed version of a sequence of input texture images, wherein the sequence of input texture images has been used by an upstream device to generate the sequence of encoded images encoded in the video signal;

retrieving, from the video signal, a sequence of depth difference maps, wherein the sequence of depth difference maps has been generated by the upstream device from a sequence of depth maps determined for the sequence of input texture images;

causing a sequence of display images derived from the sequence of encoded images and the sequence of depth difference maps to be rendered on an image display.

EEE 12. The method of EEE 11, where the video signal is encoded with residual values of inter-predicted image blocks in a plurality of inter-predicted encoded images in the sequence of encoded images.

EEE 13. The method of EEE 11 or 12, wherein motion parameters for predicting samples in the inter-predicted image blocks are generated from the sequence of depth difference maps.

EEE 14. An apparatus performing any of the methods as recited in EEEs 1-13.

EEE 15. A non-transitory computer readable storage medium, storing software instructions, which when executed by one or more processors cause performance of the method recited in any of EEEs 1-13.

The invention claimed is:

1. A method comprising:

receiving a sequence of input texture images;

determining a sequence of depth maps for the sequence of input texture images, wherein each depth map in the sequence of depth maps includes depth values of a plurality of pixels represented in a corresponding input texture image in the sequence of input texture images, wherein the plurality of pixels includes one or more pixel sets of contiguous and co-moving pixels;

generating a sequence of depth difference maps from the sequence of depth maps, wherein the sequence of depth difference maps includes at least one depth difference map that is generated from two successive depth maps in the sequence of depth maps, wherein the at least one depth difference map comprises, for each pixel set of one or more pixel sets in the depth difference map, a single planar displacement for the pixel set between the two successive depth maps and a depth value difference for each pixel in the pixel set between the two successive depth maps;

outputting a video signal encoded with a compressed version of the sequence of input texture images and the sequence of depth difference maps, wherein the video signal causes a recipient device of the video signal to generate a sequence of display images from the compressed version of the sequence of input texture images and the sequence of depth difference maps for rendering on an image display, wherein the video signal excludes motion parameters used in inter-predicted image blocks in the compressed version of the sequence of input texture images.

2. The method of claim 1, wherein the sequence of input texture images is partitioned into a sequence of groups of pictures (GOPs), wherein each depth difference map in the sequence of depth difference maps is generated for a respective GOP in the sequence of GOPs.

3. The method of claim 2, wherein the depth difference map includes depth value differences between first depth values in a first I-frame of the respective GOP and second depth values in a second I-frame of a subsequent GOP, in the sequence of GOPs, following the respective GOP.

4. The method of claim 1, wherein the compressed version of the sequence of input texture images includes a plurality of inter-predicted encoded images; wherein the plurality of inter-predicted encoded images includes an inter-predicted encoded image having one or more inter-predicted image blocks; wherein samples in each of the one or more inter-predicted image blocks are predicted based on motion parameters generated from the planar displacement of each pixel set included in the at least one depth difference map in the sequence of depth difference maps.

5. The method of claim 1, wherein the video signal excludes the sequence of depth maps used to generate the sequence of depth difference maps.

6. The method of claim 1, wherein the sequence of depth maps is generated through image analysis operations performed on the sequence of input texture images by an upstream device that receives the sequence of input texture images.

7. The method of claim 1, wherein the sequence of depth maps is received by an upstream device that receives the sequence of input texture images.

8. A method comprising:

retrieving, from a video signal, a sequence of encoded images, wherein the sequence of encoded images represents a compressed version of a sequence of input texture images, wherein the sequence of input texture images has been used by an upstream device to generate the sequence of encoded images encoded in the video signal;

retrieving, from the video signal, a sequence of depth difference maps, wherein the sequence of depth difference maps has been generated by the upstream device from a sequence of depth maps determined for the sequence of input texture images, wherein the sequence of depth difference maps includes at least one depth difference map that has been generated by the upstream device from two successive depth maps in the sequence of depth maps, and wherein the at least one depth difference map comprises, for each pixel set of one or more pixel sets of contiguous and co-moving pixels in the depth difference map, a single planar displacement for the pixel set between the two successive depth maps and a depth value difference for each pixel in the pixel set between the two successive depth maps;

causing a sequence of display images derived from the sequence of encoded images and the sequence of depth difference maps to be rendered on an image display.

9. The method of claim 8, where the video signal is encoded with residual values of inter-predicted image blocks in a plurality of inter-predicted encoded images in the sequence of encoded images.

10. The method of claim 8, wherein motion parameters for predicting samples in the inter-predicted image blocks are generated from the sequence of depth difference maps.

11. An apparatus performing the method recited in claim 1.

12. A non-transitory computer readable storage medium, storing software instructions, which when executed by one or more processors cause performance of the method recited in claim 1.

* * * * *